United States Patent Office 3,350,400
Patented Oct. 31, 1967

3,350,400
7-(PICOLYLAMINOALKYL)-THEOPHYLLINE AND ITS SALTS
Hans Suter, Dorflingen, and Hans Zutter, Schaffhausen, Switzerland, assignors to Eprova Limited, Schaffhausen, Switzerland, a corporation of Switzerland
No Drawing. Filed Oct. 20, 1965, Ser. No. 499,047
Claims priority, application Switzerland, Jan. 12, 1965, 414/65
7 Claims. (Cl. 260—253)

This invention relates to compounds which are 7-(picolylaminoalkyl)-theophyllines of the formula

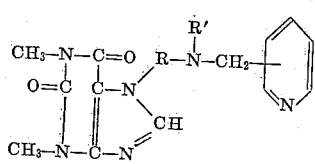

(I)

wherein R is alkylene or hydroxyalkylene and R' is hydrogen or alkyl having a carbon chain of one to three members, or addition compounds of the afore-defined 7-(picolylaminoalkyl)-theophyllines, and to methods of preparing such compounds.

It has been found that the 7-(picolylaminoalkyl)-theophyllines are vasodilators and diuretics which are more effective and/or safer than theophylline. The most favorable combination of effectiveness and safety has been found in the 7-(3'-picolylaminoalkyl) derivatives of theophylline which satisfy the above formula, and particularly in the compounds of the formula

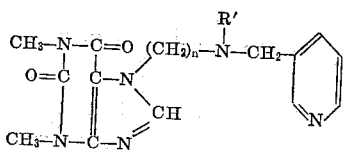

(II)

wherein $n$ is an integer between 2 and 4, and the addition compounds thereof with nicotinic acid. In the preferred compounds of the invention, $n$ is two.

The compounds of the invention are readily prepared by the reaction of theophylline derivatives of the formula

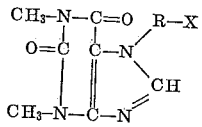

(III)

with picoline derivatives of the formula

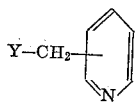

(IV)

wherein one of X and Y is the radical of an acid, and the other one is the radical of NHR', R and R' being as defined in Formula I. It is thus possible to prepare a compound of the invention from a picolylamine and a 7-alkyl- or 7-hydroxyalkyl-theophylline in which a hydrogen atom of the alkyl group is replaced by the radical of an acid. The same compound may be obtained by reacting an ester of a pyridinemethanol with a 7-aminoalkyl- or a 7-amino-hydroxyalkyl-theophylline.

The acid radical represented by X or Y in Formulas III or IV may be selected from a wide range of organic and inorganic acids. Suitable acids are the hydrogen halides, specifically hydrogen chloride, bromide, and iodide, sulfuric acid, phosphoric acid, methane-sulfonic, benzene-sulfonic, and toluenesulfonic acid, as well as carbonic acid, and others will readily suggest themselves.

When Y is NHR', —R—X may also be an epoxyalkyl radical, and it is believed that epoxyalkyltheophyllines are formed as intermediates in the reaction of picolylamines with esters of 7-(dihydroalkyl)-theophyllines in the presence of acid acceptors, such as an excess of picolylamine, for example as follows:

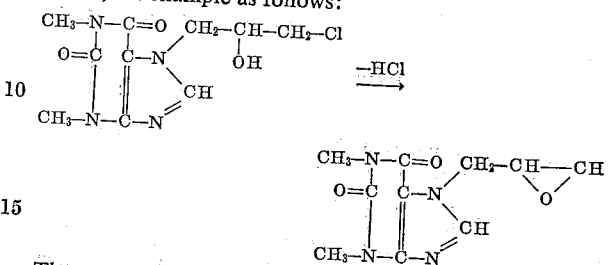

The epoxyalkyltheophylline thus formed readily reacts with 3-picolylamine to 7-(γ-3'-picolylamino-β-hydroxypropyl)-theophylline which causes hyperemia of peripheral blood vessels when applied orally.

The picolylaminoalkyl-theophyllines of the invention are water-soluble bases which readily form water-soluble acid addition salts with equivalent amounts of organic or inorganic acids. Such salts are formed, for example, with hydrochloric acid, sulfuric acid, phosphoric acid, nitric acid, lactic acid, tartaric acid, citric acid, acetic acid, sulfamidobenzoic acid, camphor-10-sulfonic acid, and nicotinic acid. The acid addition salts with nicotinic acid produce particularly strong and rapid vasodilator effects, as will be described in more detail hereinafter. The sulfamidobenzoates are stronger diuretics than the corresponding free bases whereas the addition salts of camphor-10-sulfonic acid have improved circulation effects.

The novel picolylaminoalkyl derivatives of theophylline, and particularly the derivatives of 3-picolylamine, are superior agents for increasing blood circulation.

The following examples illustrate the preparation of representative 7-(picolylaminoalkyl)-theophyllines of the invention.

EXAMPLE 1

77 g. 7-(β-bromoethyl)-theophylline (C.A. 50, 12071f) and 57.8 g. 3-picolylamine in 750 ml. toluene were refluxed 16 hours with vigorous agitation. The 3-picolylamine hydrobromine formed was filtered off, and the filtrate was evaporated in a vacuum to about one third of its original volume. About 300–400 ml. diisopropyl ether were added, and the solution was seeded with a few pure crystals of the desired product.

7 - (β - 3' - picolylaminoethyl) - theophylline crystallized over a period of a few hours. It was filtered off with suction, washed with a little diisopropyl ether, and dried. The yield of crude product was 69.3 g. (82%), its melting point 103–106° C.

The melting point was 111–112° C. after recrystallization from isopropyl acetate. The compound was identified by microanalysis.

Calculated for $C_{15}H_{18}N_6O_2$: 57.31%, C; 5.77%, H; 26.74, N. Found: 57.55%, C; 5.99%, H; 26.74%, N.

7 - (β - 3' - picolylaminoethyl) - theophylline is readily soluble in water, and the aqueous solution is weakly alkaline (pH 8–9). The solution is neutralized by equivalent amounts of organic and inorganic acids.

The free base has a significant dilating effect on the peripheral blood vesels. The toxicity to white mice ($LD^{50}$) is 1800 mg./kg. when applied orally, and 402 mg./kg. after intravenous injection.

The corresponding higher homologs of 7-(β-3'-picolylaminoethyl)-theophylline are prepared in an analogous manner from 7 - (γ - bromopropyl) - theophylline and 7-(Δ-bromobutyl)-theophylline. They are similar in their physical properties and physiological effects to 7-(β-3'-picolylaminoethyl)-theophylline.

EXAMPLE 2

39.3 g. 7 - (β - 3' - picolylaminoethyl) - theophylline were dissolved in 300 ml. boiling isopropanol, and 15.4 g. nicotinic acid were added to the solution in which the acid promptly dissolved. The nicotinate formed crystallized after a short time. It was filtered with suction and dried. The yield was 52.3 g. (95.5%). The melting point of 159–160° C. was not significantly changed by recrystallization from ethanol.

Calculated for $C_{21}H_{23}N_7O_4$: 57.65%, C; 5.3%, H; 22.42%, N. Found by microanalysis: 57.39%, C; 5.02%, H; 22.45%, N.

The salt is very soluble in water so that 40% solutions can readily be prepared. The compound may be applied orally or parenterally, particularly by intravenous injection or infusion. Its toxicity to white mice ($DL_{50}$) is 2530 mg./kg. when applied orally, and 595 mg./kg. intravenously. Daily oral dosages of 500 mg./kg. over four weeks were tolerated by rats without change in the growth rate, as determined by weight increase, in the motility, or in the blood count. No pathological changes of the inner organs could be found in autopsies of the animals at the end of the four-week period. The weights of the livers and of the kidneys did not differ from the corresponding weights in untreated controls.

EXAMPLE 3

25.8 g. 7-(β-bromoethyl)-theophylline and 22 g. N-3-picolylmethylamine in about 600 ml. toluene were refluxed 3 to 4 hours with agitation. The brown suspension formed was cooled to ambient temperature and filtered with suction to remove a precipitate mainly consisting of 3-picolylmethylamine hydrobromide.

The filtrate was evaporated to dryness in a vacuum, and the residue was recrystallized from ethyl acetate, and additional material insoluble in the solvent was removed by filtration from the hot solution. 7-(β-N-3-picolyl-N-methylaminoethyl)-theophylline crystallized from the filtrate upon cooling. The crude product weighed 24.5 g. (83%) and melted at 134–137° C. When recrystallized from isopropyl acetate, it melted at 136–137° C.

Calculated for $C_{16}H_{20}N_6O_2$: 58.32%, C; 6.14%, H; 25.60%, N. Found by microanalysis: 58.53%, C; 5.53%, H; 25.92%, N.

The compound is very soluble in water to form alkaline solutions which can be converted to the solutions of acid addition salts by equivalent amounts of corresponding acids.

The corresponding higher homologs of 7-(β-N-3'-picolyl-N-methylaminoethyl)-theophylline which have similar properties are prepared in an analogous manner from N-3-picolylethylamine and N-3-picolylpropylamine.

EXAMPLE 4

50.9 g. 7-γ-chloro - β - hydroxypropyl) - theophylline (German Patent No. 224,159) and 402 g. 3-picolylamine in 600 ml. toluene were refluxed about 20 hours with rapid agitation, and the solvent phase was decanted from an oily precipitate of 3-picolylamine hydrochloride. The clear solution was evaporated to dryness in a vacuum, and the residue obtained (52 g.) was also of oily consistency.

The oily material was dissolved in ethyl acetate and seeded with a minute amount of the desired 7-γ-3'-picolylamino-β-hydroxypropyl)-theophylline. Formation of copious crystals was thereby initiated. The crude, dry product weighed 49 g. and had a melting point of 99–104° C. The purified product, when recrystallized from ethyl acetate, methyl acetate, or isopropyl acetate melts at 110–112° C.

Calculated for $C_{16}H_{20}N_6O_3$: 55.80%, C; 5.85%, H; 24.41%, N. Found by microanalysis: 56.07%, C; 6.10%, H; 24.51%, N. 7-(γ-3'-Picolylamino-β-hydroxypropyl)-theophylline is water soluble. Its effect on hyperemia of the peripheral blood vessels has been mentioned above. Its oral toxicity to white mice ($DL_{50}$) is 5000 mg./kg.

EXAMPLE 5

Tablets were prepared by mixing 100 parts 7-(β-3'-picolylaminoethyl)-theophylline nicotinate with 30 parts lactose and about 30 parts starch, granulating the mixture with a solution of 5 parts polyvinylpyrrolidone, drying the granulate, admixing 29 additional parts of starch, 5 parts talcum, and 2 parts magnesium stearate, and tableting the granular mass to form units containing 100 mg. each of the active agent of the invention.

Dragees were made from cores prepared as the above tablets and coated with three layers of shellac solution and talcum, one layer consisting of sugar syrup and of a mixture of calcium carbonate, talcum, sugar, and finely dispersed silica, one layer of sugar syrup and gum arabic, layers of sugar syrup, magnesium carbonate, talcum, wheat flour, and again talcum, and ultimately an outer layer of syrup simplex.

The coating of each dragee contained:

| | Mg. |
|---|---|
| Shellac | 3 |
| Mixture of $CaCO_3$, talcum, sugar, and silica | 3 |
| Gum arabic | 1 |
| Talcum | 40 |
| Flour | 5 |
| Sugar | 100 |
| Magnesium carbonate | 10 |

Suppositories were made in a conventional manner from 250 parts 7-(β-3'-picolylaminoethyl)theophylline nicotinate, 2000 parts of a commercial suppository base mainly consisting of synthetic polyethylene oxides, and 1 part polyoxyethylenesorbitan monooleate. The excipient material was fused and the active agent was admixed in several small portions with agitation. The uniform mixture was permitted to cool, and was then formed into suppositories each containing 250 mg. of the active agents.

Injectable solutions containing 1, 2, and 5% respectively of 7-(β-3'-picolylaminoethyl)-theophylline nicotinate were prepared from 1, 2, and 5 g. of the active agent, a sufficient amount of bi-distilled water, and a disodium phosphate/monopotassium phosphate buffer to adjust the pH to 7. Glass ampules having capacities of 1, 2, 5, and 10 ml. were filled with the solutions so prepared, sealed by fusion of the glass, and then sterilized.

The medicinal compositions described above are preferably applied in doses of 200 to 2000 mg. of the active agent per day. This dosage may be maintained over an extended period.

The dilating action of the compounds of the invention is not limited to the peripheral blood vessels in the manner of the known derivatives of nicotinic acid or pyridine derivatives having alcoholic hydroxyl groups, but also affects the main arteries. They cause a considerable increase in the blood circulation in the internal organs, particularly the muscles and the brain, and generally support circulation.

The vessel dilating and heart stimulating effects of these compounds are readily observed at the coronary vessels in which the circulation increase may exceed 100%. The compounds also have a significant diuretic effect which is beneficial to the general blood circulation. Their toxicity is very low as has been shown above, and their therapeutic indices are correspondingly high.

The following table shows comparative data on toxicity, diuretic action, and dilating effect on the coronary vessels for:

Compound I: 7-(β-3'-picolylaminoethyl)-theophylline,

Compound II: the nicotinic acid addition salt of Compound I,
Compound III: 7-(λ-3'-picolylamino-β-hydroxypropyl)-theophilline,
Compound IV: theophylline, and
Compound V: 7-β-hydroxypropyl-theophylline.

The toxicity was determined on white mice (LD$_{50}$) in oral application.

The diuretic effect was determined on rats, and the figures listed in the column "diuresis" constitute the differences between the integrated values of the 7-hour urine secretion curves of three rats treated with oral doses of the several active agents and the corresponding values for three untreated rats.

The dilating effect on coronary vessels was determined on isolated rabbit hearts according to the method of Langendorff. The listed values constitute the maxima that could be achieved without toxic cardiac symptoms.

| Compound | Toxicity, mg./kg. | Diuretic effect | | | Dilat'g effect on coronary vessels | |
|---|---|---|---|---|---|---|
| | | Dosage, mg./kg. | Diuresis | Therap. Index | Conc'n | Circ'n increase, percent |
| I | 1,800 | 70 | 59.8 | 1,537 | 1×10⁻³ | 120 |
| II | 2,500 | 300 | 76.6 | 621 | 3×10⁻⁴ | 150 |
| III | 5,000 | 500 | 44.6 | 450 | 1×10⁻⁴ | 60 |
| IV | 285 | 50 | 67.4 | 384 | 1.10⁻⁴ | 49 |
| V | 920 | 250 | 61.6 | 226 | 2.5×10⁻⁴ | 61 |

The greater safety and efficiency of the compounds I, II, III of the invention as compared to the known compounds IV and V are evident from the table. The new compounds are thus used to advantage as vasodilators and diuretics.

What is claimed is:

1. A compound which is a 7-picolylaminoalkyl-theophylline of the formula

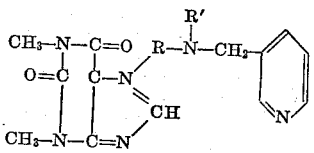

wherein R is lower alkylene or hydroxyalkylene having two to four carbon atoms, and R' is hydrogen or methyl, or an addition compound of said 7-picolylaminoalkyl-theophylline with a physiologically tolerated acid.

2. A compound as set forth in claim 1, wherein said compound is an addition compound of said 7-picolyl-aminoalkyl-theophylline with nicotinic acid.

3. A compound which is a 7-picolylaminoalkyl-theophylline of the formula

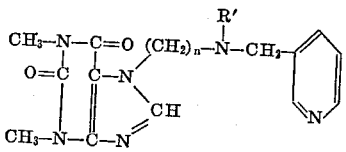

wherein R' is hydrogen or methyl, and n is an integer between 2 and 4; or an addition compound of said 7-picolylaminoalkyl-theophylline with nicotinic acid.

4. A compound as set forth in claim 3, wherein n is two.

5. A compound as set forth in claim 4 which is an addition compound of nicotinic acid.

6. A compound as set forth in claim 3, wherein n is 2, R' is hydrogen, the compound being a free base.

7. The nicotinic acid addition compound of the compound of claim 6.

References Cited

UNITED STATES PATENTS 3,029,239  4/1962  Kohlstaedt et al. ----- 260—253
3,032,554  5/1962  Jucker et al. -------- 260—256

OTHER REFERENCES

Burger, Medicinal Chem. 2nd ed., Interscience Publishers, Inc., New York, 1960, page 78.

ALEX MAZEL, *Primary Examiner.*

M. U. O'BRIEN, R. J. GALLAGHER,
*Assistant Examiners.*